(12) United States Patent
Gilligan et al.

(10) Patent No.: US 11,668,431 B2
(45) Date of Patent: Jun. 6, 2023

(54) DISPLAY MOUNTING SYSTEM

(71) Applicants: Joshua Gardner Gilligan, New York, NY (US); Thomas Christopher Issa, Kingston (JM)

(72) Inventors: Joshua Gardner Gilligan, New York, NY (US); Thomas Christopher Issa, Kingston (JM)

( * ) Notice: Subject to any disclaimer, the term of this patent is extended or adjusted under 35 U.S.C. 154(b) by 0 days.

(21) Appl. No.: 17/240,391

(22) Filed: Apr. 26, 2021

(65) Prior Publication Data
US 2021/0332938 A1    Oct. 28, 2021

Related U.S. Application Data

(60) Provisional application No. 63/016,035, filed on Apr. 27, 2020.

(51) Int. Cl.
| | | |
|---|---|---|
| *F16M 11/20* | (2006.01) | |
| *F16M 11/24* | (2006.01) | |
| *F16M 1/022* | (2006.01) | |
| *F16M 11/38* | (2006.01) | |
| *F16M 11/04* | (2006.01) | |

(52) U.S. Cl.
CPC ......... *F16M 11/2064* (2013.01); *F16M 11/24* (2013.01); *F16M 1/022* (2013.01); *F16M 11/046* (2013.01); *F16M 11/2021* (2013.01); *F16M 11/2085* (2013.01); *F16M 11/38* (2013.01); *F16M 2200/068* (2013.01)

(58) Field of Classification Search
CPC ........... F16M 11/2064; F16M 11/2092; F16M 11/2014; F16M 11/24; F16M 2200/068; F16M 2200/08; F16M 11/2085; F16M 11/38; F16M 11/2021; F16M 11/046; F16M 13/022; A47B 83/001; A47B 21/00
See application file for complete search history.

(56) References Cited

U.S. PATENT DOCUMENTS 3,565,152 A * 2/1971 Cohn, Jr. .............. E04B 2/7427
40/605
4,831,791 A * 5/1989 Ball ...................... A47B 83/001
160/351
6,161,487 A * 12/2000 Chang ................... A47B 21/00
108/50.01

(Continued)

FOREIGN PATENT DOCUMENTS

WO    WO-2019128074 A1 *  7/2019

*Primary Examiner* — Tan Le

(57) ABSTRACT

A display mounting system including a central upright support, a first support arm connecting a first terminal upright support to the central upright support, a second support arm connecting a second terminal upright support to the central upright support, and a mounting bracket. The mounting bracket is connected to one of the support arms and is configured to receive an electronic display. At least one of the support arms is rotatably connected to the central upright support such that the support arms can be selectively rotated between an open position and a collapsed position. In embodiments, the support arms are configured to disconnect from the central upright support and the terminal upright supports such that the central upright support and a support arm can be removed, or additional central upright supports and support arms can be incorporated.

15 Claims, 17 Drawing Sheets

(56) References Cited

U.S. PATENT DOCUMENTS

| | | |
|---|---|---|
| 6,343,006 B1 | 1/2002 | Moscovitch et al. |
| 6,554,238 B1 | 4/2003 | Hibberd |
| 6,751,914 B2 * | 6/2004 | Zeh ...................... A47B 83/001 |
| | | 248/223.41 |
| 8,317,146 B2 | 11/2012 | Jung et al. |
| 8,596,599 B1 | 12/2013 | Carson et al. |
| 8,814,115 B2 | 8/2014 | Muday et al. |
| 9,400,083 B2 | 7/2016 | Sapper et al. |
| 9,625,090 B2 | 4/2017 | Kuan |
| 9,632,399 B2 | 4/2017 | Corey et al. |
| 9,746,128 B2 * | 8/2017 | Huang ............... F16M 11/2014 |
| 10,010,169 B2 | 7/2018 | Grotenhuis |
| 10,520,131 B2 * | 12/2019 | Burke ................ F16M 11/2092 |
| 10,753,531 B2 | 8/2020 | Huang |
| 10,760,727 B2 | 9/2020 | Huang |
| 2003/0015632 A1 | 1/2003 | Dunn et al. |
| 2004/0195471 A1 | 10/2004 | Sachen, Jr. |
| 2010/0271287 A1 | 10/2010 | Bourne et al. |
| 2013/0092805 A1 | 4/2013 | Funk et al. |
| 2013/0334376 A1 | 12/2013 | Moscovitch |
| 2015/0083870 A1 * | 3/2015 | Steelman ................ A47B 21/06 |
| | | 248/188.7 |
| 2017/0191607 A1 | 7/2017 | Huang |
| 2020/0015588 A1 * | 1/2020 | Patrick ................... F16M 11/32 |

* cited by examiner

DISPLAY MOUNTING SYSTEM

CROSS REFERENCE TO RELATED APPLICATIONS

This application claims the benefit of the filing date of U.S. provisional patent application Ser. No. 63/016,035, filed on Apr. 27, 2020, entitled "Portable Freestanding Electronics Display Mounting System" which is incorporated herein by reference in its entirety.

BACKGROUND

Multi-display mounting arms and stands can be found in business offices and residential workspaces all across the world. Research has indicated that employees tend to be more productive when working with more than one display screen. In certain contexts, additional display screens are even culturally synonymous with productivity. In response, companies and inventors have developed a variety of products designed to facilitate the simultaneous use of multiple electronic displays.

Many such display mounting systems need to be permanently or semi-permanently fixed to a hard, even surface, like a desk, to support the weight of the monitors that they are designed to hold. For this reason, they tend to be largely unportable.

Other display mounting systems, known as "freestanding" display mounting systems, are able to support the weight of multiple monitors without being permanently fixed to a hard surface. However, they have large bases to support the additional weight of the monitors they hold, which makes them impractical in any context where a user seeks to retain usability of the surface on which the display mounting system rests. Although these "freestanding" display mounting systems are inherently more portable than the display mounting systems that require permanent attachment, they tend to be large and cumbersome.

With the global workforce growing increasingly more remote, and employees being given the flexibility to work outside of their company offices, many are opting to work in their homes. Because many people maintain a less structured workspace at home, these at-home employees may be unsatisfied with today's multi-display mounting systems which either require permanent attachment or have large bases, which obstruct a substantial portion of the surface on which the system rests.

Therefore, a need exists for a display mounting system that has a small footprint but is also portable. A sufficiently portable mounting system should be highly compact so that the user can easily carry the system between rooms or place the system into a bag or vehicle for easy transport. Additionally, there is a need for this mounting system to offer all of the same functionality as existing and widely used multi-display mounts to offer the same level of increased productivity that is generally expected from multi-monitor use. For this reason, it would be beneficial if the mounting system were modular such that the user can easily switch between using multiple monitors where space allows and using fewer monitors or a single monitor where space is more limited.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

The described apparatuses and methods relate to the field of display mounting systems and more particularly to electronic display mounting systems that have improved adjustability, modularity, and/or portability. Traditional display mounting systems require either permanent fixation or take up a substantial amount of valuable desk space. As a result, individuals may find it difficult to have reliable access to a workstation with multi-monitor capability in an increasingly remote work environment.

The display mounting system described herein, in aspects, gives a user multi-monitor capability while maintaining portability and flexibility by providing a combination of upright supports and support arms configured to support mounting brackets, with attached displays, wherein the support arms can rotate around a central upright support between an open position and a collapsed position.

A first terminal upright support is connected to a central upright support via a first support arm and a second terminal upright support is connected to the central upright support via a second support arm. At least one of the support arms is rotatably connect to the central upright support such that the support arms may be folded from an open position, where the support arms extend from the central upright support in substantially opposite directions, or form a "V," to a collapsed position, where the support arms extend from the central upright support in substantially the same direction. In embodiments, the central upright support has a double-arm connector configured to receive the two support arms and a base configured to at least partially support the weight of the display mounting system and attached displays. The base can be implemented with a flat surface configured to simply rest on a desk or workstation or as a clamping mechanism. The base can further be removable, such that a user can select the desired base configuration or such that the display mounting system can maintain its portability while the base can be permanently or semi-permanently fixed to a desk or workstation. The terminal upright supports each have an arm connector configured to receive one of the support arms and a foot configured to at least partially support the weight of the display mounting system and attached displays. In certain embodiments, the feet can rotate relative to the arm connector, from a position substantially perpendicular to the support arms which allows the feet to resist the additional weight of the attached displays and prevent the display mounting system from tipping, to a position substantially parallel to the support arms for transport.

Mounting brackets configured to receive electronic displays or alternative mounting modules, such as a laptop tray configured to hold a laptop computer, can be attached to the support arms. The mounting brackets can each incorporate a mounting plate configured to directly receive an electronic display, a grab handle connected to the mounting plate and configured to at least partially support the weight of the display mounting system and attached displays, and a clamping block, or alternative fastening mechanism, adjustably securing the mounting plate to one of the support arms. The clamping block, or alternative fastening mechanism, can be adjustable to allow a user to adjust both the location and angle of the mounting plate and connected display relative to the corresponding support arm. The grab handles can be configured such that when the display mounting system is in the collapsed position, the grab handles come together to form a combined handle configured to support the weight of the display mounting system and attached displays and be grabbed by one hand. A height adjustment mechanism can also be incorporated into the mounting brackets or upright supports such that the display mounting system can accommodate displays of different sizes or such that a user can adjust the height of the attached displays. The support arms, base and double-arm connector of the central upright support, feet and arm connectors of the terminal supports, grab handles of the mounting brackets, and height adjustment mechanism need not lock, but the display mounting system can further incorporate locking mechanisms for added convenience and security.

The support arms can be removably connected to the upright supports such that the user can optionally remove the central upright support and a support arm or add additional upright supports and central support arms to accommodate any number of displays. For example, a user could disconnect the central upright support and one support arm, retaining both terminal upright supports and one support arm, then reconnect the terminal upright supports directly via a single support arm. Alternatively, a user could disconnect the central upright support from one of the terminal support arms, insert any number of additional central upright supports and support arms, then reconnect the terminal upright supports via a chain of alternating central upright supports and support arms.

In embodiments, the display mounting system comprises a central upright support, a first support arm connecting a first terminal upright support to the central upright support, a second support arm connecting a second terminal upright support to the central upright support, and at least one mounting bracket connected to one of the support arms and configured to receive an electronic display, wherein at least one support arm rotates relative to the central upright support, moving the terminal upright supports from an open position to a collapsed position.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

DETAILED DESCRIPTION

Aspects of the system and methods are described below with reference to illustrative embodiments. The references to illustrative embodiments below are not made to limit the scope of the innovation. Instead, illustrative embodiments are used to aid in the description of various aspects of the systems and methods. Additional embodiments may differ from the referenced illustrative embodiments without departing from the innovation. Accordingly, the following description, made by way of example, is not to be construed as limiting as regards any aspect of the claimed subject matter.

Figure 1:
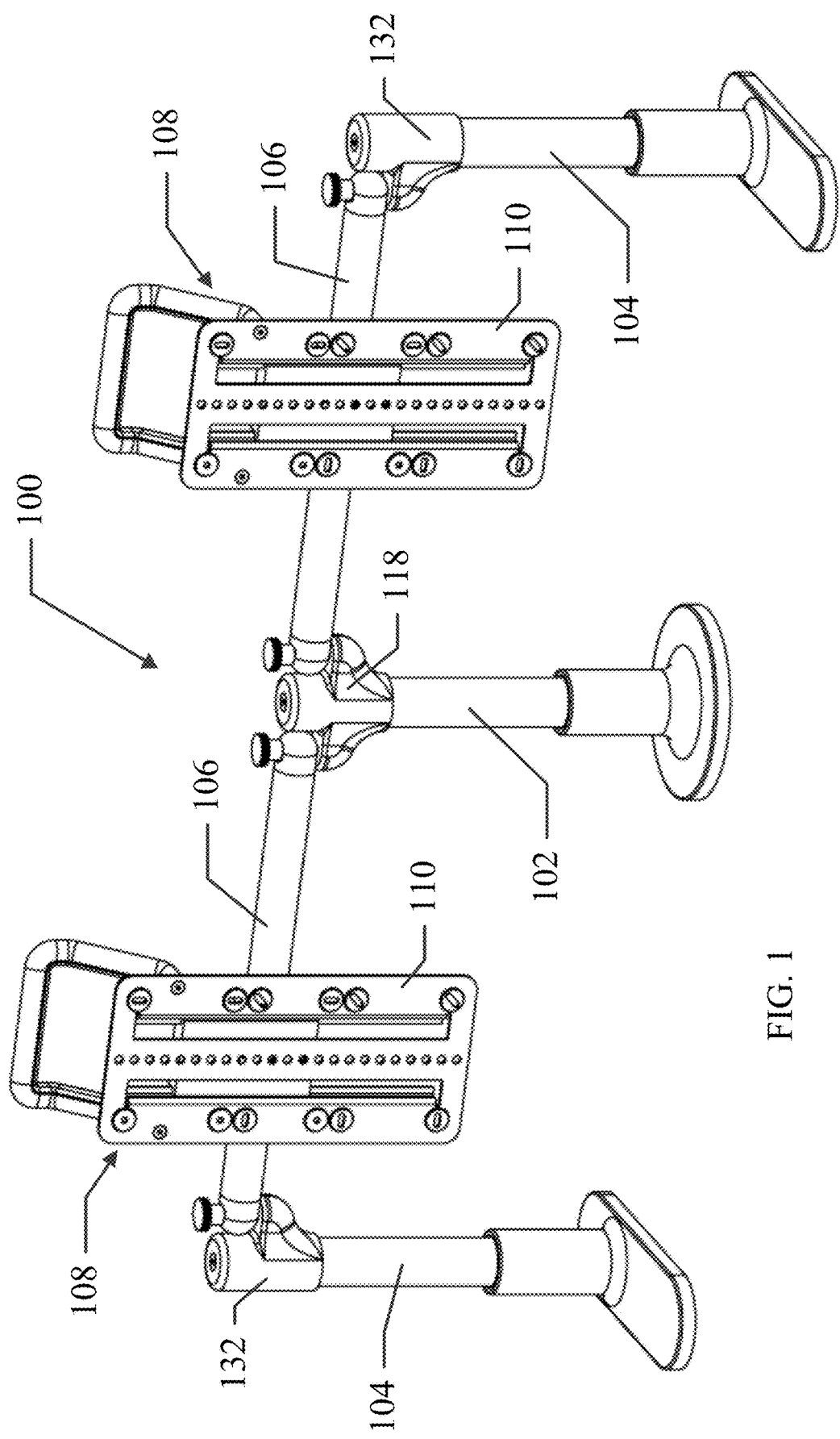
FIG. 1 depicts a front perspective view of an embodiment of a modular display mounting system in an open position.

FIG. 1 depicts an embodiment of a display mounting system 100 that is configured to hold two displays 101; however, it is contemplated that this and other embodiments may be reduced to mount a single display 101 or expanded to mount three or more displays 101 as will be explained further below. In the illustrated embodiment, the display mounting system 100, also referred to herein as the system, is shown with a central upright support 102 connected to two terminal upright supports 104. The term central is used herein to mean within a chain of elements, as opposed to terminating a chain of elements. It is not limited to describing the exact, or even approximate center point of the system 100, but is used instead to describe the relative position of the upright support within a chain of connected elements. Here a terminal upright support 104 is positioned on each side of the central upright support 102 and the terminal and central upright supports 102 and 104 are connected via support arms 106. In this configuration, displays 101 can be attached to mounting brackets 108 on each of the support arms 106. The system 100 can be arranged so that the upright supports 102 and 104 are all in a row, as shown, or the support arms 106 can rotate so that the support arms 106 form a "V." In a V-shaped configuration, the displays 101 are angled toward a user facing the central upright support 102.

An embodiment of the display mounting system 100 generally comprises two terminal upright supports 104 connected to a central upright support 102 by support arms 106, with mounting brackets 108 connected to the support arms 106 that can receive electronic displays 101. In this instance, the mounting brackets 108 each comprise a mounting plate 110 with a standard-sized, four-screw mounting configuration capable of mating with most standard-sized computer monitors, a grab handle 112, and a fastening mechanism 114 that secures the mounting bracket 108 to the support arm 106. In the embodiments shown in FIG. 1, the support arms 106 and upright supports 102 and 104 are substantially cylindrical; however, it should be appreciated that other elongated shapes, such as a rectangular prism, can be utilized.

Figure 2:
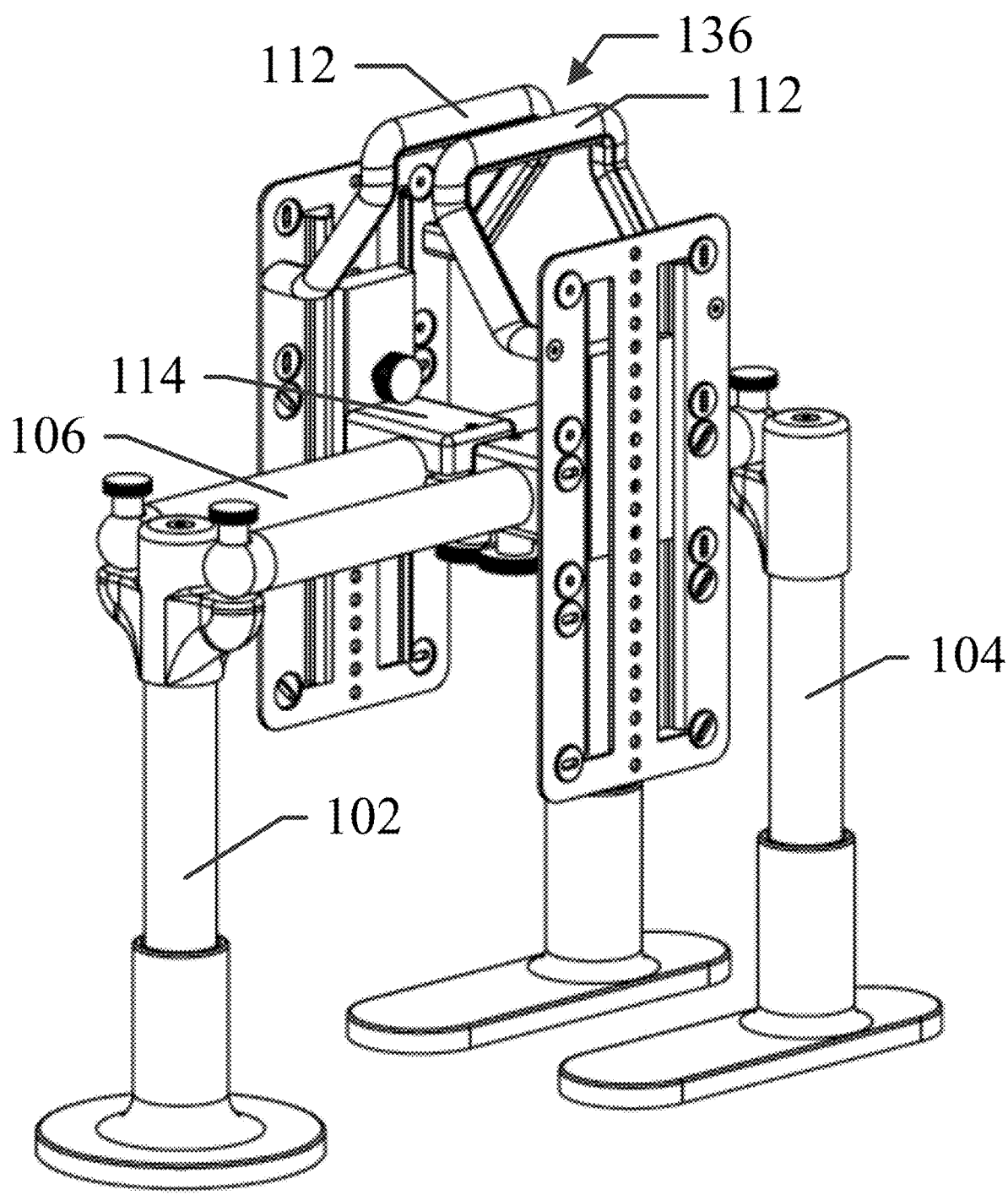
FIG. 2 depicts a perspective view of the display mounting system of FIG. 1 in a collapsed position.
Figure 3:
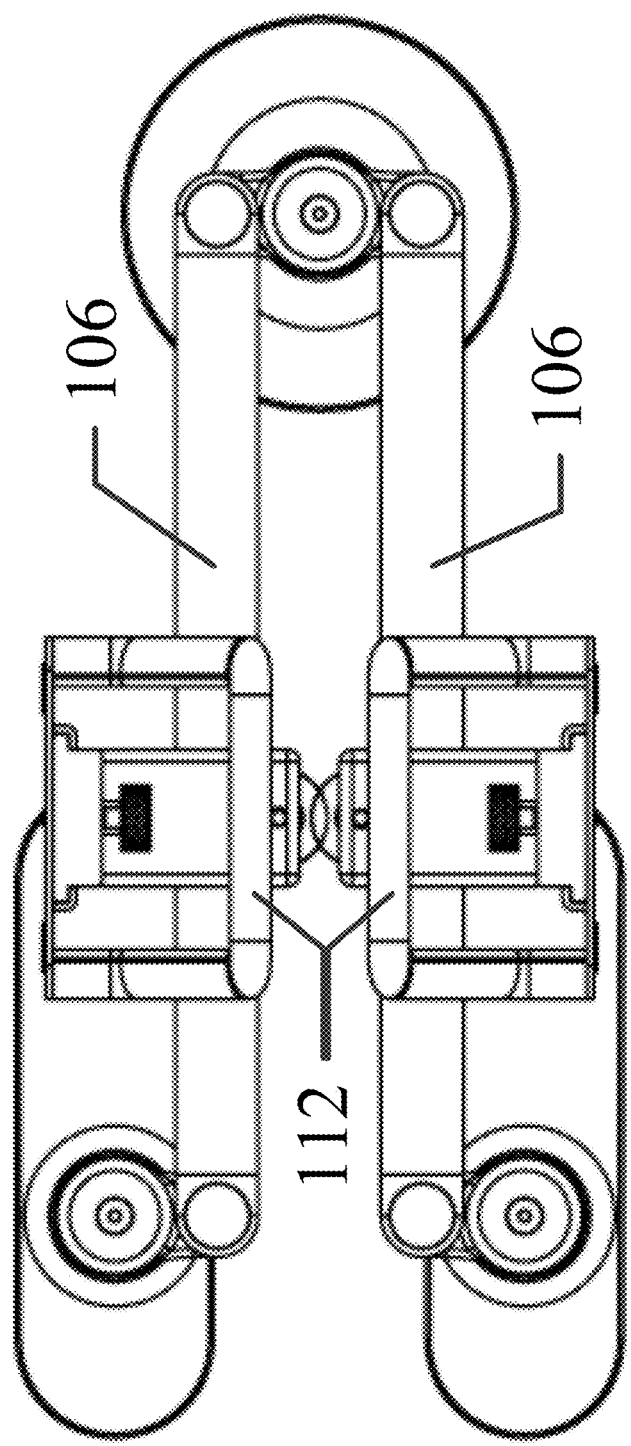
FIG. 3 depicts a top view of the display mounting system of FIG. 1 in a collapsed position.
Figure 4:
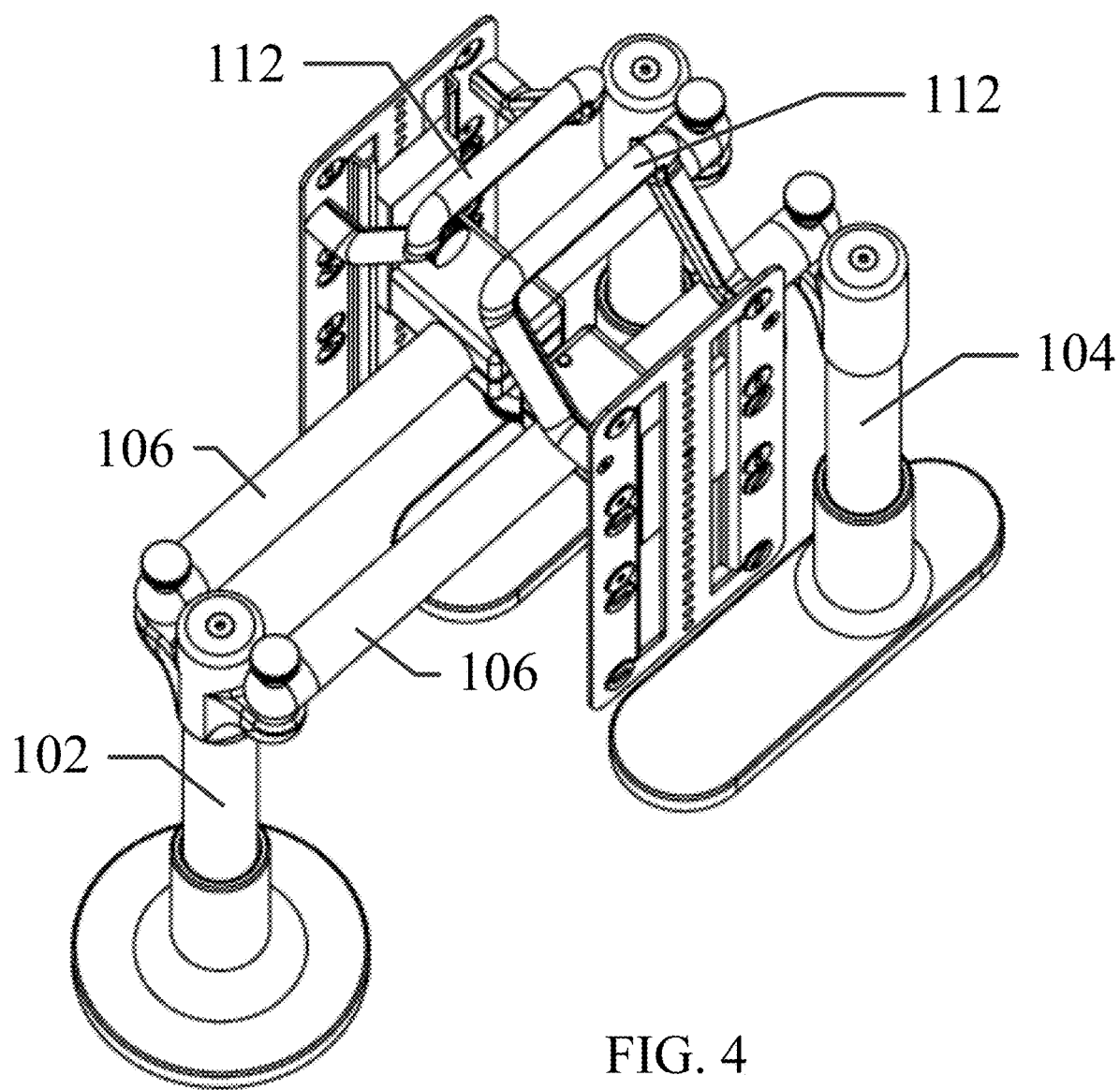
FIG. 4 depicts a top perspective view of the display mounting system of FIG. 1 in a collapsed position.

Referring to FIGS. 2-4, the display mounting system 100 can be folded or rotated in on itself for storage or transport. The support arms 106 can be selectively rotated around the central upright support 102 from an open, substantially linear or V-shaped position to a collapsed position and vice versa. In the open position, the attached displays 101 generally face the user and the rotatable support arms 106 permit the attached displays 101 to be angled for the user's preference. In the collapsed position, the system 100 can be easily transported, with or without attached displays 101. As can clearly be seen in FIG. 3, in the collapsed position, the grab handles 112 of the mounting brackets 108 can be positioned so that the system 100 can be grabbed one-handed, and feet 115 of the terminal upright supports 104 rotated so that system 100 adopts a slim profile.

Figure 5:
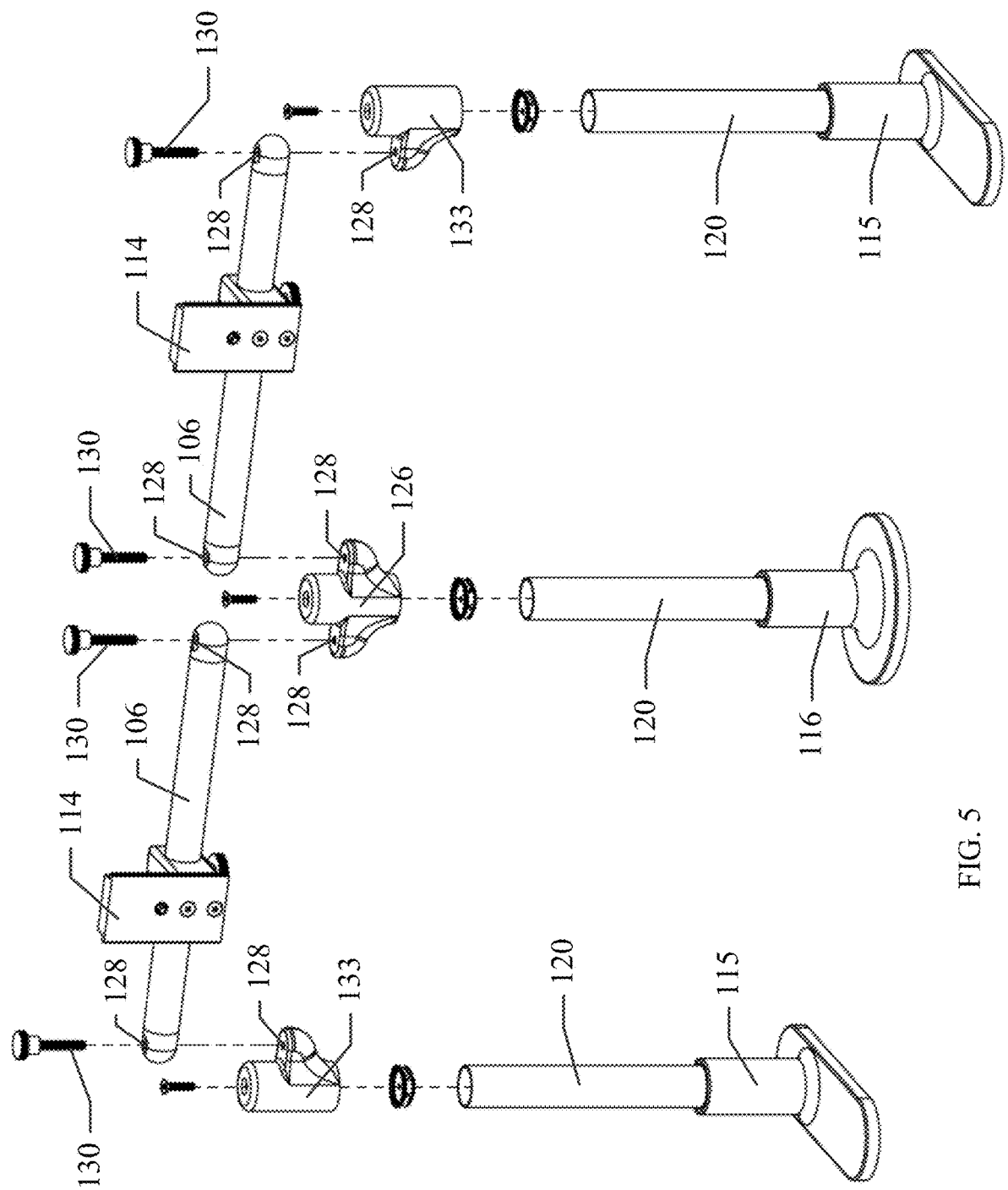
FIG. 5 depicts an exploded front perspective view of the display mounting system of FIG. 1 with mounting brackets partially removed in an open position.
Figure 6:
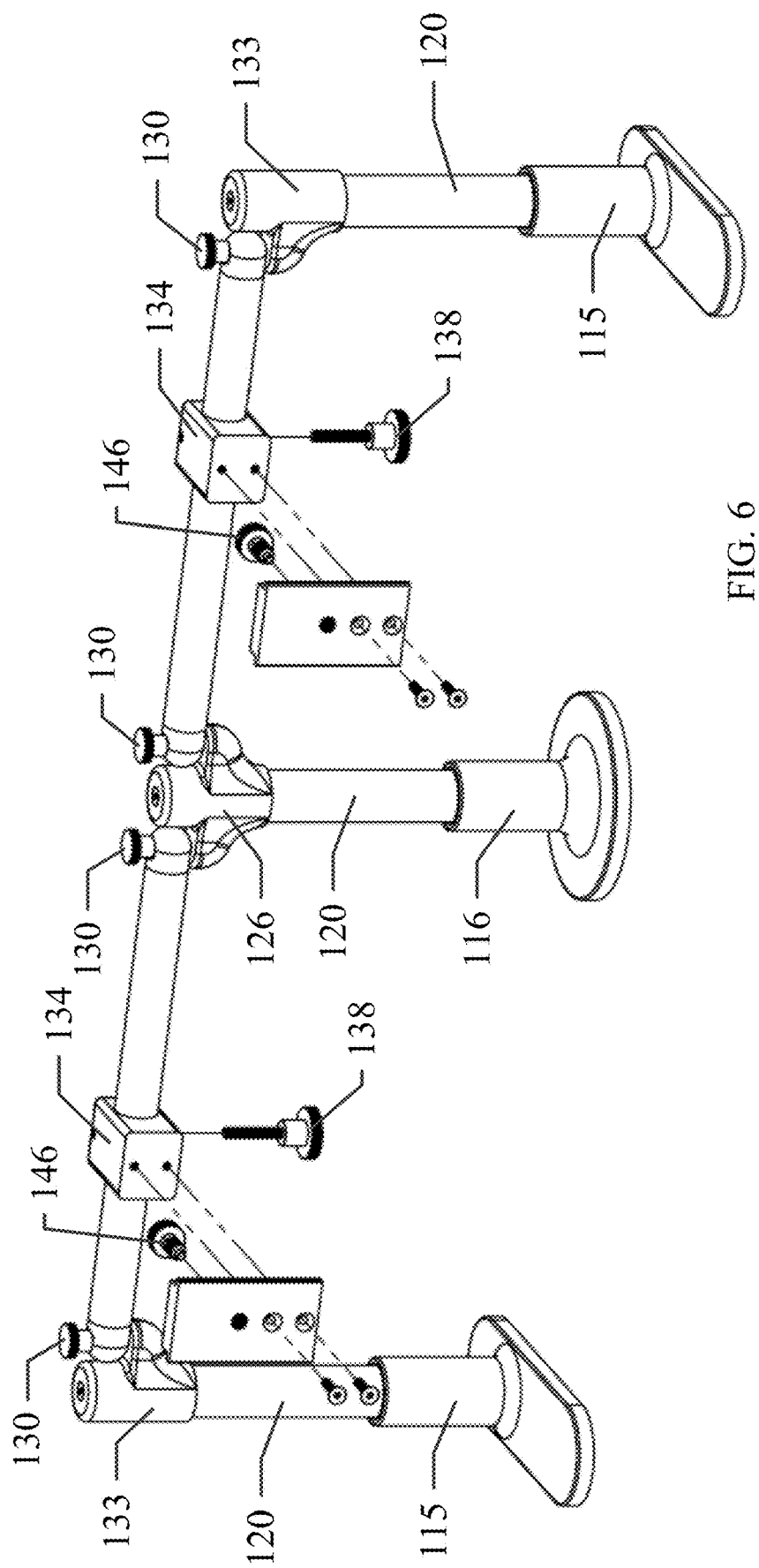
FIG. 6 depicts another exploded front perspective view of the display mounting system of FIG. 1 with mounting brackets partially removed in an open position.
Figure 13:
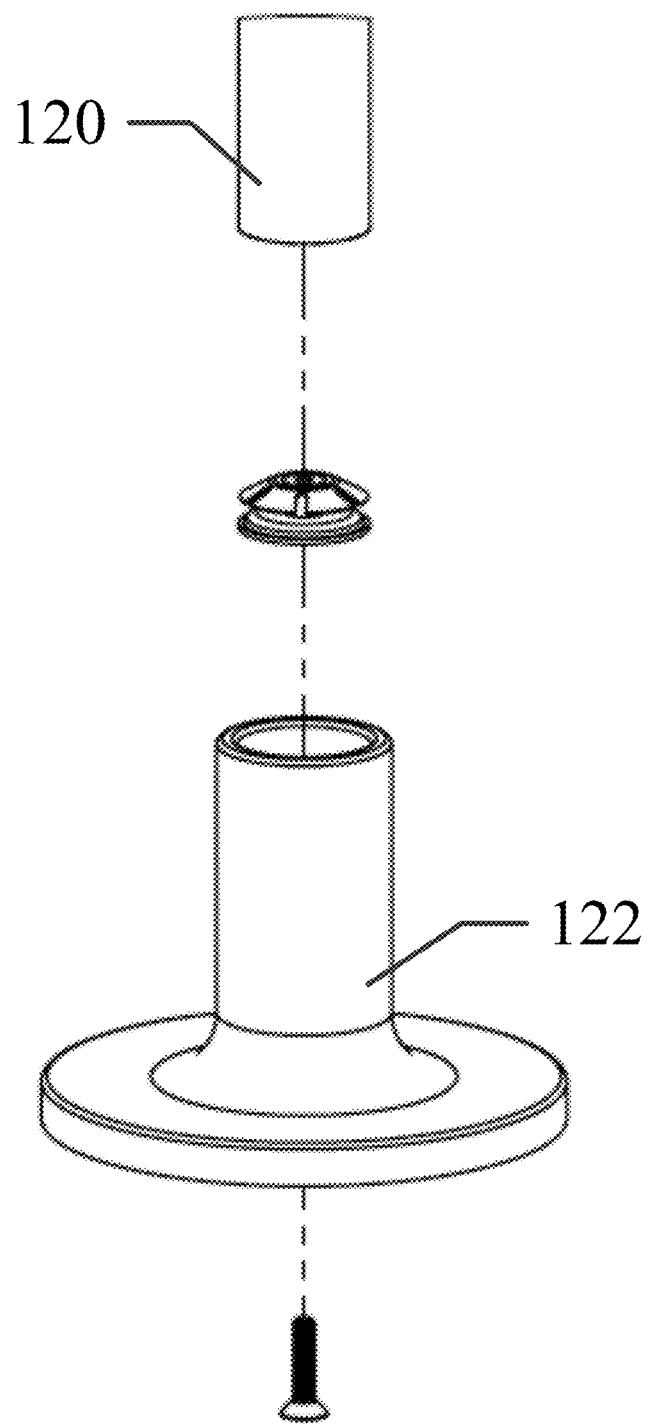
FIG. 13 depicts an exploded perspective view of an embodiment of a platform-style base of a central upright support.
Figure 14:
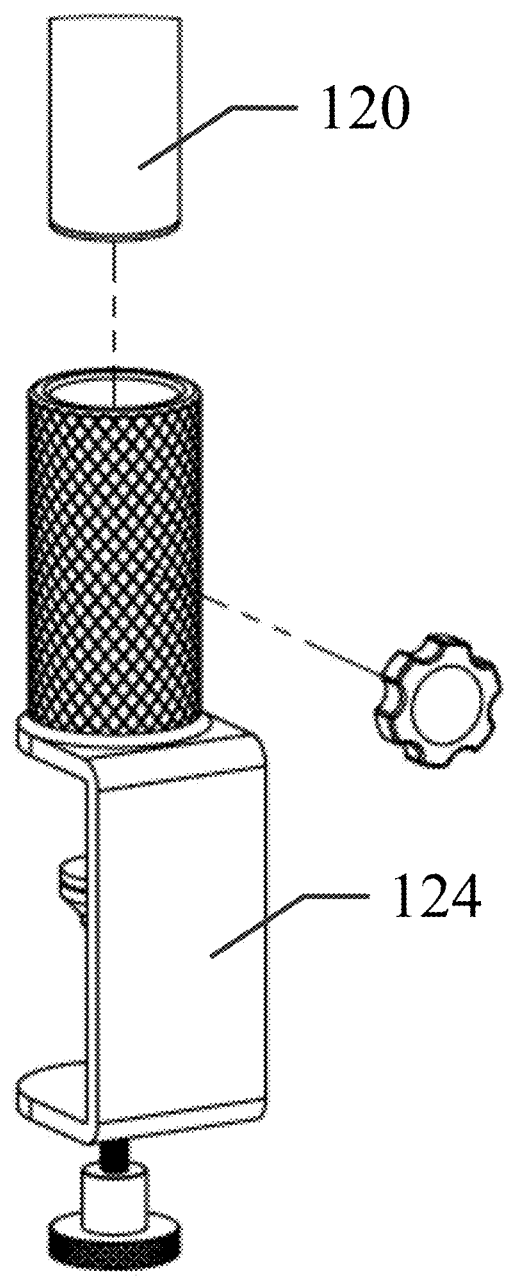
FIG. 14 depicts an exploded perspective view of a clamp-style base of a central upright support.

Turning now to FIG. 5, an exploded view of the display mounting system 100 is shown, with mounting brackets 108 partially removed. In embodiments, the central upright support 102 comprises a base 116, a double-arm connector 118 configured to receive two support arms 106 and a leg 120 that extends up from the base 116 to the double-arm connector 118. As shown in FIG. 13, the base 116 can be implemented as a platform-style base 122 that rests on a substantially flat surface. Alternatively, as shown in FIG. 14, the base 116 can also be implemented as a clamp-style base 124 that attaches to the supporting work surface. It is further contemplated that the base 116 can be implemented with any other configuration capable of partially supporting the weight of the system 100 and attached displays 101. Regardless of the configuration of the system 100, the base 116 can also be removable to allow a user to select the most appropriate base 116 style for the desired use. As illustrated, the platform-style base 122 is circular and provides omni-directional support, but it is contemplated that the base 116 can be any geometry that provides sufficient support.

The double-arm connector 118 of the central upright support 102 can be implemented as a double-sided fixed collar 126 configured to receive both of the support arms 106. The collar 126 can be fixed onto the central upright support 102 by shrink fit, welding or another suitable method. The collar 126 can also be selectively fixed to the central upright support 102 with an adjustable clamp or other method. In this instance, the collar 126 can be raised or lowered to increase or decrease the height of attached displays 101. The collar 126 can be made of a metal, plastic or any other appropriate material. The collar 126 and each of the support arms 106 comprises a substantially cylindrical opening 128 through which pins 130 can pass, forming hinged connections about the pins 130. The pins 130 maintain the connections between the support arms 106 and the collar 126 and define the axes of rotation about which the support arms 106 can rotate. While there is only one collar 126 that receives both support arms 106 in the embodiment shown in FIG. 5, it is contemplated that each support arm 106 can be connected to the central upright support 102 by a separate collar. It is further contemplated that only one of the support arms 106 be rotatably connected to the central upright support 102 and the other support arm 106 be statically connected to the central upright support 102. While a hinge connection is shown, any other connection method that allows for rotation of at least one of the support arms 106 can be used.

In another embodiment, a plurality of collars can be connected to the central upright support 102 and fixed to the support arms 106 such that the support arms 106 can rotate about the central upright support 102. In such an embodiment, the collars can be fixed at an appropriate height on the central upright support 102 via a groove in the central upright support 102, a supporting shelf on the central upright support 102 or any other appropriate device.

Figure 12:
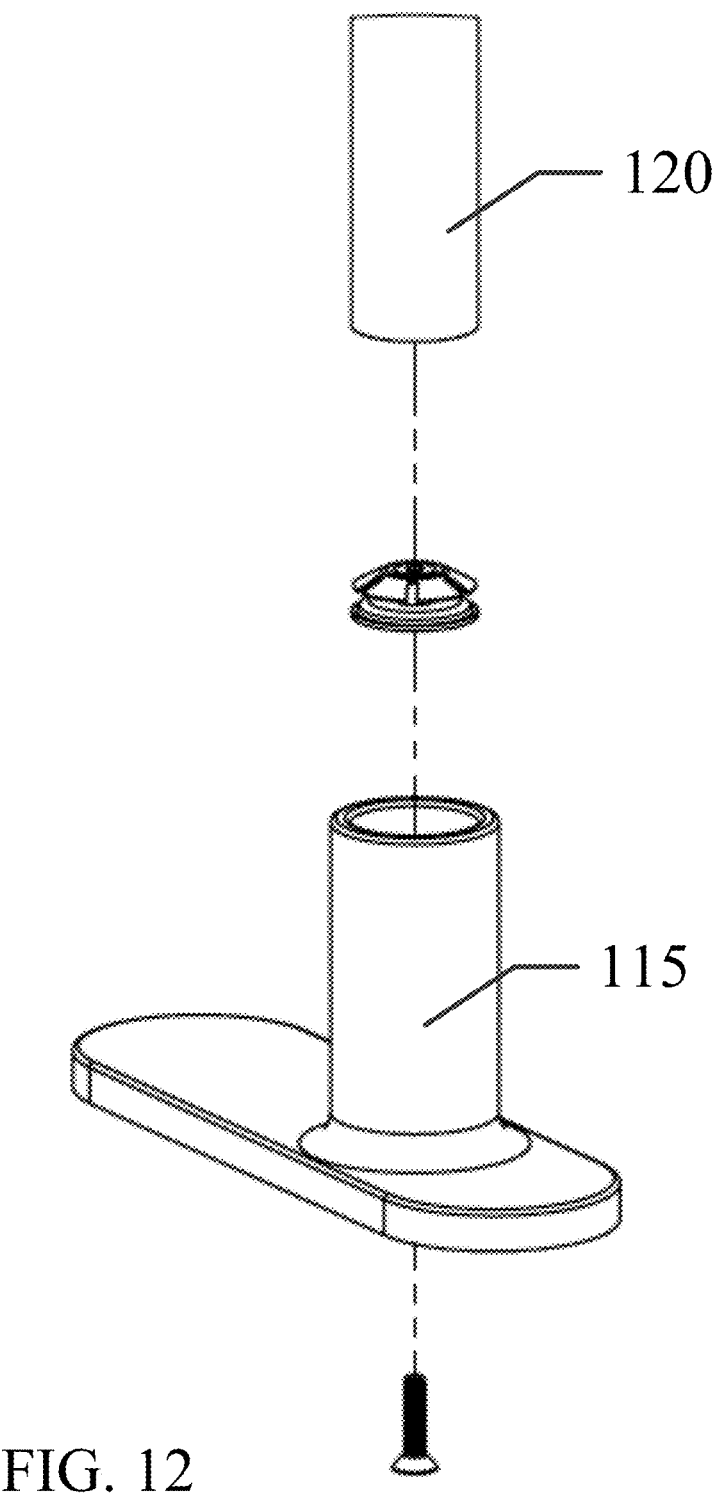
FIG. 12 depicts an exploded rear perspective view of an embodiment of a foot of a terminal upright support.

Referring now to FIG. 1 and FIG. 12 more particularly, in embodiments, the terminal upright supports 104 each comprise a foot 115, an arm connector 132 configured to receive a support arm 106, and a leg 120 that extends up from the foot 115 to the arm connector 132. As shown in FIG. 12, each foot 115 can comprise a first portion configured to receive the leg 120 and second portion connected to the first portion that extends a sufficient distance, substantially perpendicularly from the terminal upright support 104, such that the foot 115 is capable of countering the moment of force created by the weight of a monitor or other display 101 when said monitor or display 101 is attached to the display mounting system 100. It is contemplated that the feet 115 can be implemented with any other configuration capable of supporting the weight of the system 100 and attached displays 101 and prevent the system 100 from tipping.

In embodiments, the feet 115 are shaped approximately as rectangular prisms with a base width of approximately 0.5 inches, but other versions may use different shapes. In another embodiment, the feet 115 may be X-shaped, or similar. Additionally, each foot 115 of the terminal upright supports 104 of the display mounting system 100 may have a different shape. The feet 115 are preferably made of a formable, substantially rigid material, such as hard plastic, composite, or any thin sheet metal. In embodiments, each foot 115 can have pads one on each end. These pads may be made from a plastic or rubber material for increased grip, security, and protection of the underlying surface. The feet 115 can be removable and substitutable to allow a user to select the most appropriate foot 115 configuration. Regardless of configuration, the feet 115 can also be rotatable to allow the system 100 to adopt a slim profile for storage or transport.

The arm connector 132 of each terminal upright support 104 can be implemented as a single-sided fixed collar 133 configured to receive one of the support arms 106. Similar to the collar 126 of the central upright support 102, the collar 133 of the terminal upright support 104 can be fixed onto the terminal upright support 104 by shrink fit, welding or another suitable method. The collar 133 can also be selectively fixed to the terminal upright support 104 with an adjustable clamp or other method. The collar 133 can be formed from a metal, plastic or any other appropriate material. As shown in FIG. 5, the collar and the support arm 106 can each comprise a substantially cylindrical opening 128 through which a pin 130 can pass, forming a hinged connection about the pin 130. The pin 130 maintains the connection between the support arm 106 and the collar 133 and defines the axis of rotation about which the support arm 106 can rotate. Although in the embodiment shown in FIG. 5, the support arms 106 are rotatably connected to the corresponding collars 133 of the terminal upright supports 104, it is contemplated that the support arms 106 can be statically connected to the collars 133 of the terminal upright supports 104.

Figure 7:
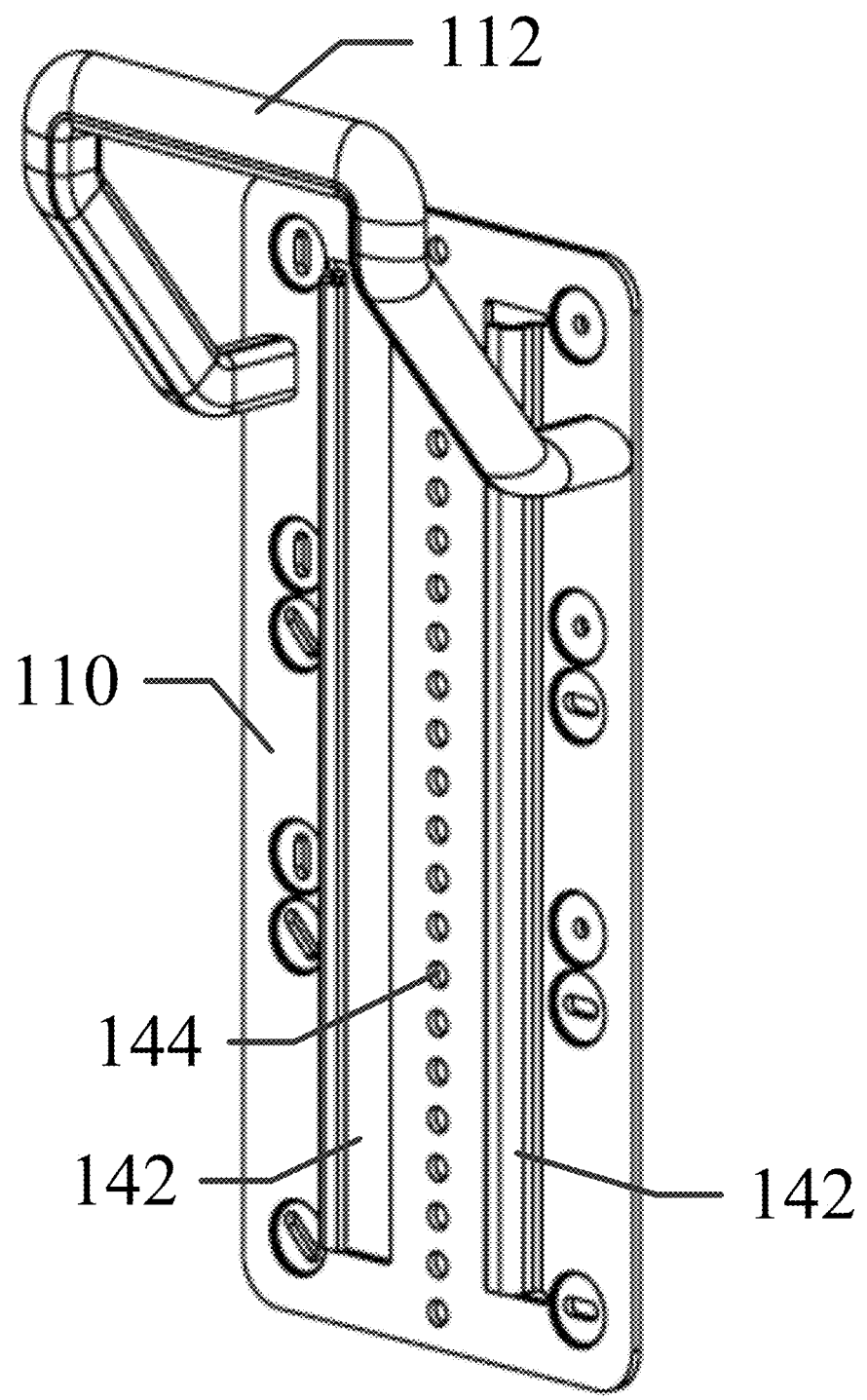
FIG. 7 depicts a rear perspective view of an embodiment of a mounting plate and grab handle of a mounting bracket.
Figure 8:
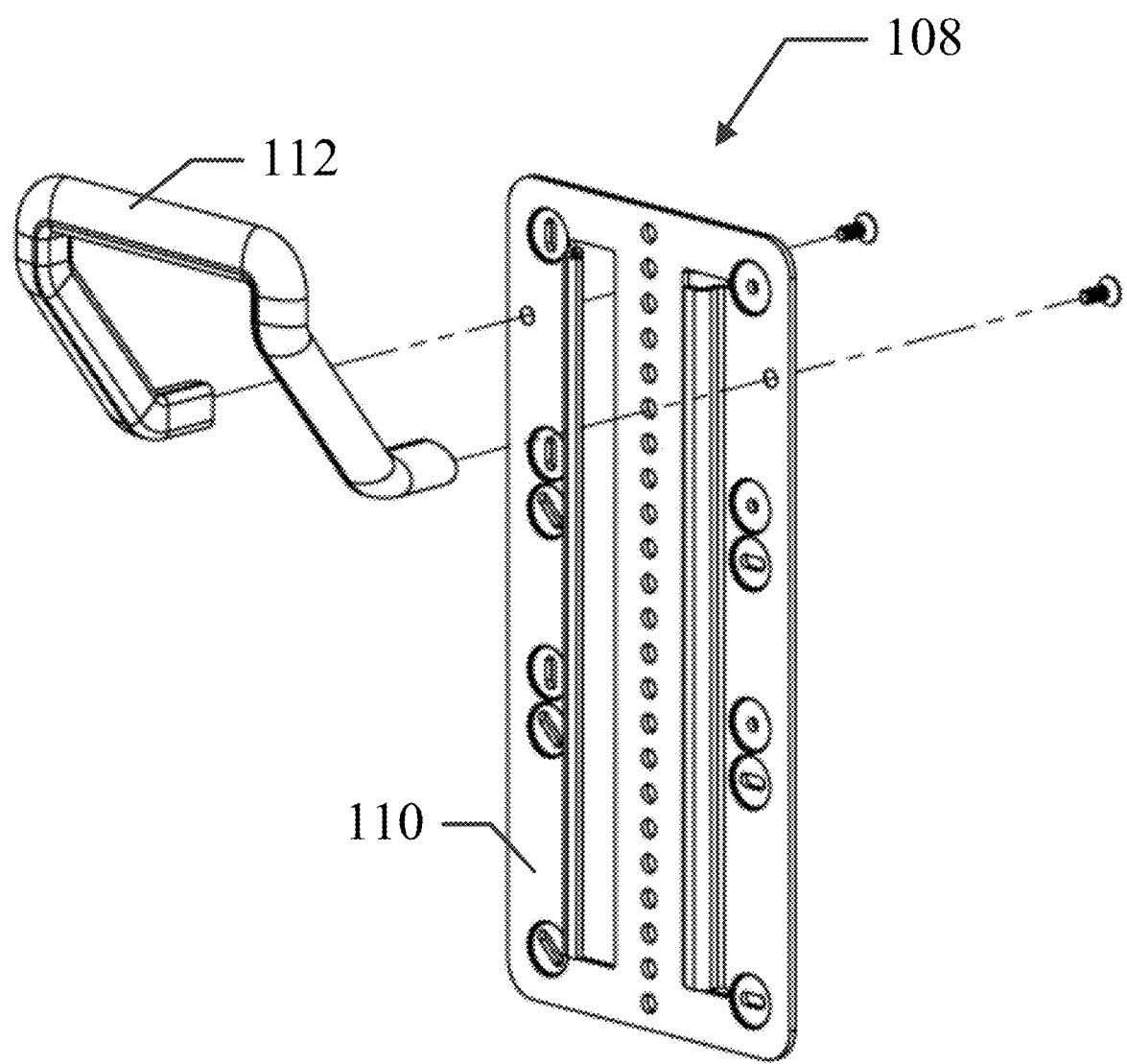
FIG. 8 depicts an exploded rear perspective view of the mounting plate and grab handle of FIG. 7.
Figure 9:
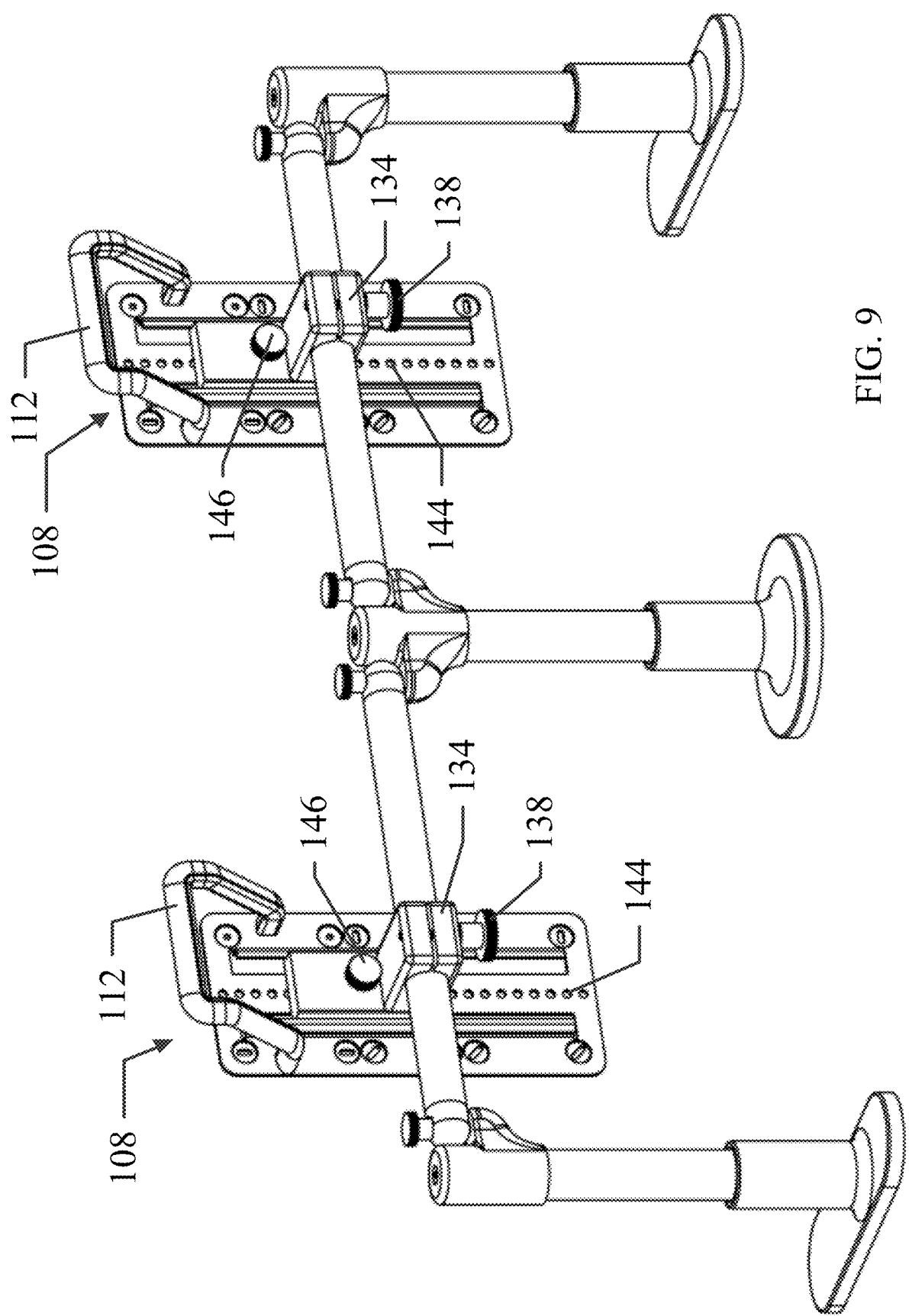
FIG. 9 depicts a rear perspective view of the display mounting system of FIG. 1 in an open position.

Turning now to FIGS. 7, 8 and 9, in embodiments, the mounting bracket 108 comprises a mounting plate 110, a grab handle 112 connected to the mounting plate 110 and a fastening mechanism 114 configured to attach the mounting plate 110 to one of the support arms 106. In the embodiments shown in FIG. 9, the fastening mechanism 114 is implemented as a clamping block 134 and the mounting plate 110 is implemented as a standard sized VESA mount. The VESA mount refers to a family of standards defined by the Video Electronics Standards Association conventionally used for mounting flat-panel monitors, televisions, and other displays to walls. However, the VESA mount is used in accordance with the display mounting system 100 to provide a mounting method that enables the generic monitor support to attach a wide variety of monitors to the system 100. The original VESA mount (MIS-D) includes four screws arranged in a square, with the horizontal and upright distance between the screw centers being 100 mm. A 75 mm×75 mm layout is defined for smaller displays 101.

Referring again to FIGS. 7 and 8, in embodiments, the grab handle 112 is attached to the back of the mounting plate 110 and extends backwards, away and up from the mounting plate 110. In the embodiments, the grab handle 112 is attached via screws to the upper portion of the back of the mounting plate 110. As shown in FIGS. 2-4, the grab handle 112 can be configured such that in embodiments utilizing one central upright support 102, two terminal upright supports 104, two support arms 106 and a mounting bracket 108 attached to each support arm 106, the grab handles 112 can come together to form a single combined handle 136 that can be grabbed by one hand when the display mounting system 100 is in the collapsed position. This provides for convenient transportation of the system 100 with or without attached displays 101.

As shown in FIG. 9, the fastening mechanism 114 can be implemented as a clamping block 134. In embodiments, the clamping block 134 secures the mounting plate 110 to one of the support arms 106 and can be adjusted and fixed using a pin or securing screw 138, which can be tightened to secure the clamping block 134 or loosened to adjust the position of the clamping block 134 or entirely remove the clamping block 134 from the support arm 106. The clamping block 134 is therefore selectively slidable on, rotatable relative to, and removable from the corresponding support arm 106. In the embodiment shown in FIG. 9, the clamping blocks 134 are rotatable, slidable, and removable.

For ergonomic reasons, or to accommodate larger displays 101, it may be beneficial to adjust the height of the mounting plate 110. In embodiments, the mounting bracket 108 further comprises a height adjustment mechanism that allows the height of the mounting plate 110, to be raised or lowered relative to the clamping block 134. In the embodiments shown in FIGS. 1 and 9, the height adjustment mechanism is implemented as two guide channels 142, a series of apertures 144, and a securing screw 146. The securing screw 146 can be loosened to allow the mounting plate 110 to slide uprightly relative to the clamping block 134 or tightened to fix the upright position of the mounting plate 110 relative to the clamping block 134. In other embodiments, height adjustment can be implemented via the upright supports 102 and 104. For example, the upright supports 102 and 104 can include telescoping legs. The legs 120 of the upright supports 102 and 104 can each comprise an inner shaft and an outer shaft with a pop pin locking mechanism. The height of the mounting plate 110 can be adjusted by offsetting the height of the outer shafts of the upright supports 102 and 104 relative to the inner shafts of the upright supports 102 and 104. By inserting each push pin into higher notches of the outer shafts, the outer shafts can be raised relative to the inner shafts, thereby raising the mounting plate 110. In other embodiments, the height adjustment mechanism can be implemented via the upright supports 102 and 104 by coordinated threads and grooves such that the outer shaft of each upright support 102 and 104 can be raised or lowered relative to the inner shaft by screwing or unscrewing the inner shaft. Other embodiments may use a cam lock, set knob lock, spring button lock, snap locking or any similar mechanism to adjust the height of the upright supports 102 and 104. In other embodiments, the mounting bracket 108 further comprises an angle adjustment mechanism configured to allow the user to adjust the angle to the mounting bracket 108 and attached display 101 relative to the support arm 106.

As shown in the embodiment in FIG. 1, the support arms 106 are rotatably connected to both the central upright support 102 and the terminal upright supports 104. However, it is contemplated that the support arms 106 can also be statically connected to the terminal upright supports 104. The rotatable connection between the central upright support 102 and the support arms 106 allows the support arms 106 to rotate towards each other, forming a collapsed state, as shown in FIGS. 3 and 4, and away from each other, forming an open state, as shown in FIG. 1, or any desired angle in between. In the embodiment shown in FIG. 1, both support arms 106 are fully rotatable; however, in other embodiments, the collapsed state may be achieved with one statically connected support arm 106 and one rotatable support arm 106 capable of rotating 180 degrees or, alternatively, with two support arms 106 capable of rotating at least 90 degrees.

Figure 16:
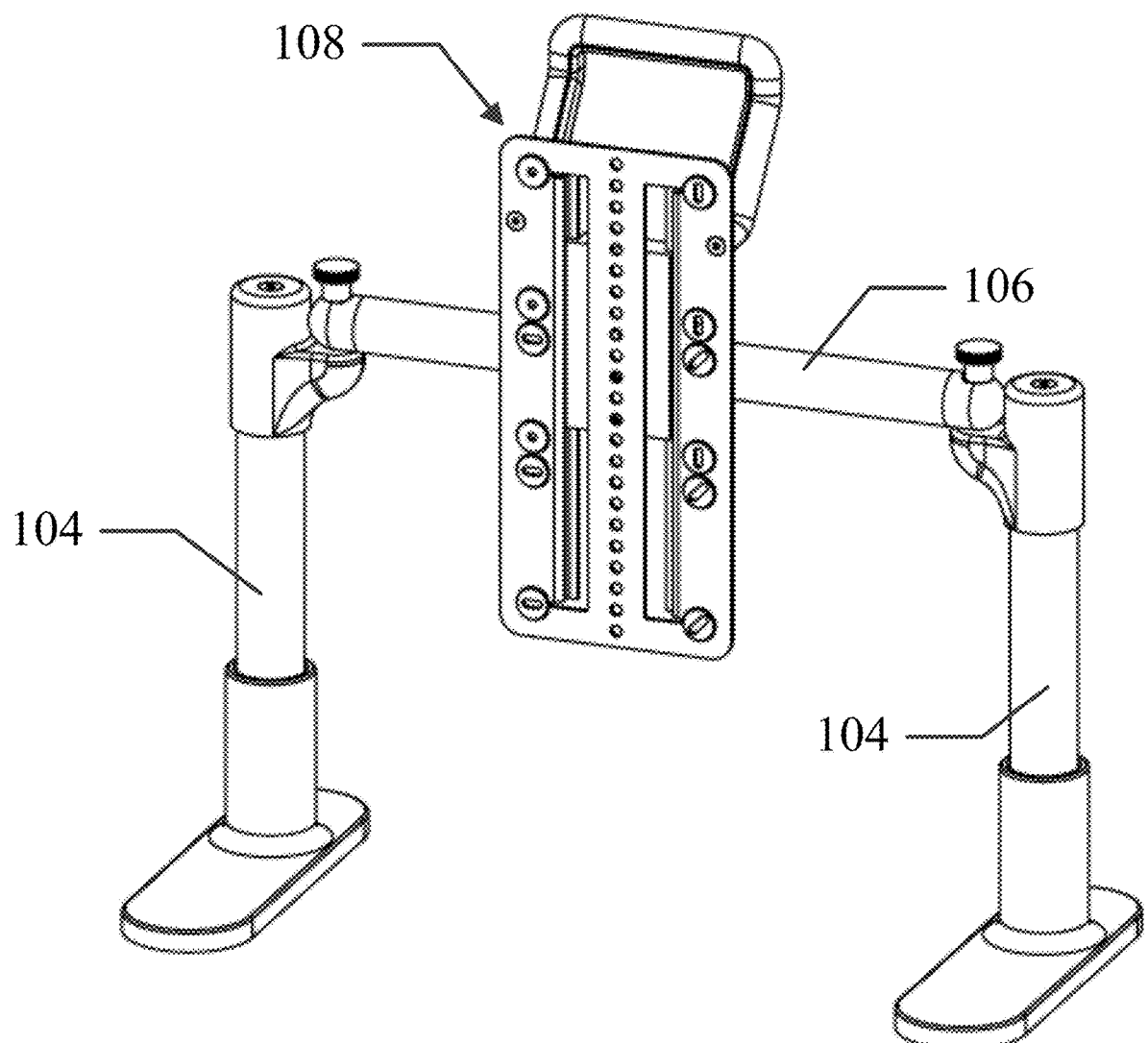
FIG. 16 depicts a front perspective view of another embodiment of a display mounting system configured to hold a single display.
Figure 17:
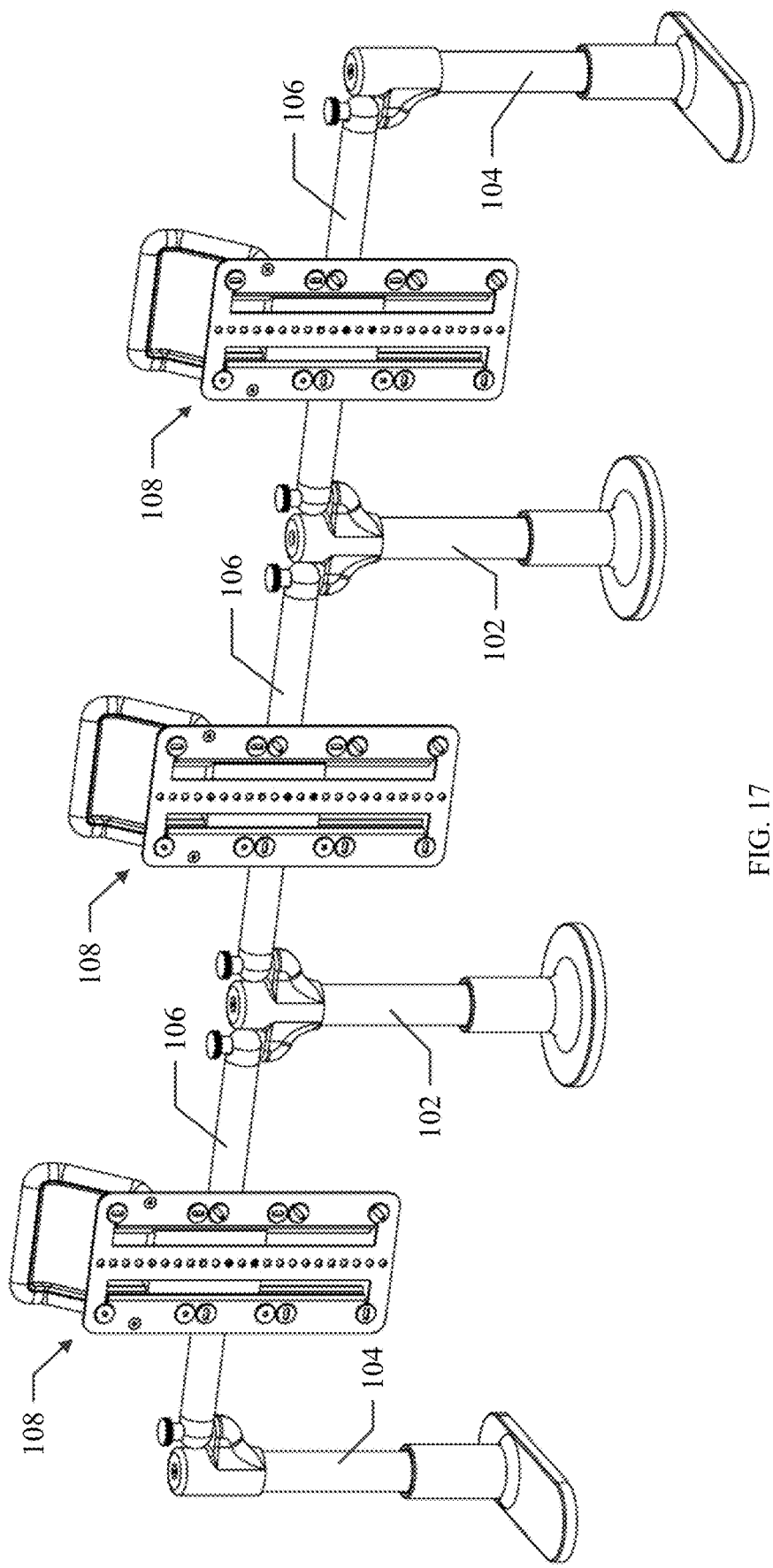
FIG. 17 depicts a front perspective view of yet another embodiment of a display mounting system configured to hold three displays.

As shown in FIGS. 16 and 17, in embodiments, the display mounting system 100 may be reduced to mount a single display 101 or expanded to mount three or more displays 101. Referring to FIGS. 5, 6 and 12-14, various aspects of the system 100 can be selectively detachable. As shown in FIG. 5, in embodiments, the support arms 106, central upright support 102 and terminal upright supports 104 may be selectively detached or reattached. As shown in FIG. 16, embodiments of the system 100 can be reduced to mount a single display 101 by disconnecting the terminal upright supports 104 by detaching one of the support arms 106 and the central upright support 102 and then reconnecting the terminal upright supports 104 directly via a single support arm 106. Alternatively, as shown in FIG. 17, embodiments of the display mounting system 100 can be expanded to mount three or more displays 101 by disconnecting the terminal upright supports 104, retaining the central upright support 102 and both support arms 106, and then reconnecting the terminal upright supports 104 via the retained central upright support 102 and support arms 106 and any number of additional central upright supports 102 and support arms 106.

As shown in FIGS. 12-14, the base 116 of the central upright support 102 and the feet 115 of the terminal upright supports 104 can be selectively detachable and substitutable. FIG. 12 shows an embodiment of a foot 115 that can be used with a terminal upright support 104. The foot 115 can be attached via a screw, bolt, adhesive or any other suitable connector. As discussed above, the foot 115 can rotate to stabilize the display mounting system 100 in an open position or to create a slim profile when the display mounting system 100 is in the collapsed position. While shown in this embodiment as an oval or rectangle with rounded corners, the feet 115 can be any shape suitable for supporting and stabilizing the display mounting system 100. An advantage of the rotation of the feet 115 is that it allows the user to customize the position of the feet 115 on the supporting surface, allowing them to select the position optimal for their individual needs.

FIG. 13 depicts a platform-style base 122 of the central upright support 102. In this embodiment, the platform-style base 122 is circular and does not necessarily need to rotate between the open and collapsed position. However, any other shape or size of platform-style base 122 can be utilized. In general, because the display mounting system 100 is resting on two feet 115 and a base 116 spread out over a wide area, each of the feet 115 and the base 116 can be relatively small without negatively impacting the stability of the device. This small and customizable footprint leave precious desk space or supporting surface space available for keyboard, mouse, papers and other tools. Finally, FIG. 14 depicts a clamp-style base 124 that can be used in place of the platform-style base 122 or either of the feet 115. This allows the system 100 to attach via the clamp-style base 124 to the edge of a work surface, further minimizing the footprint of the display mounting system 100 on the supporting surface.

Figure 10:
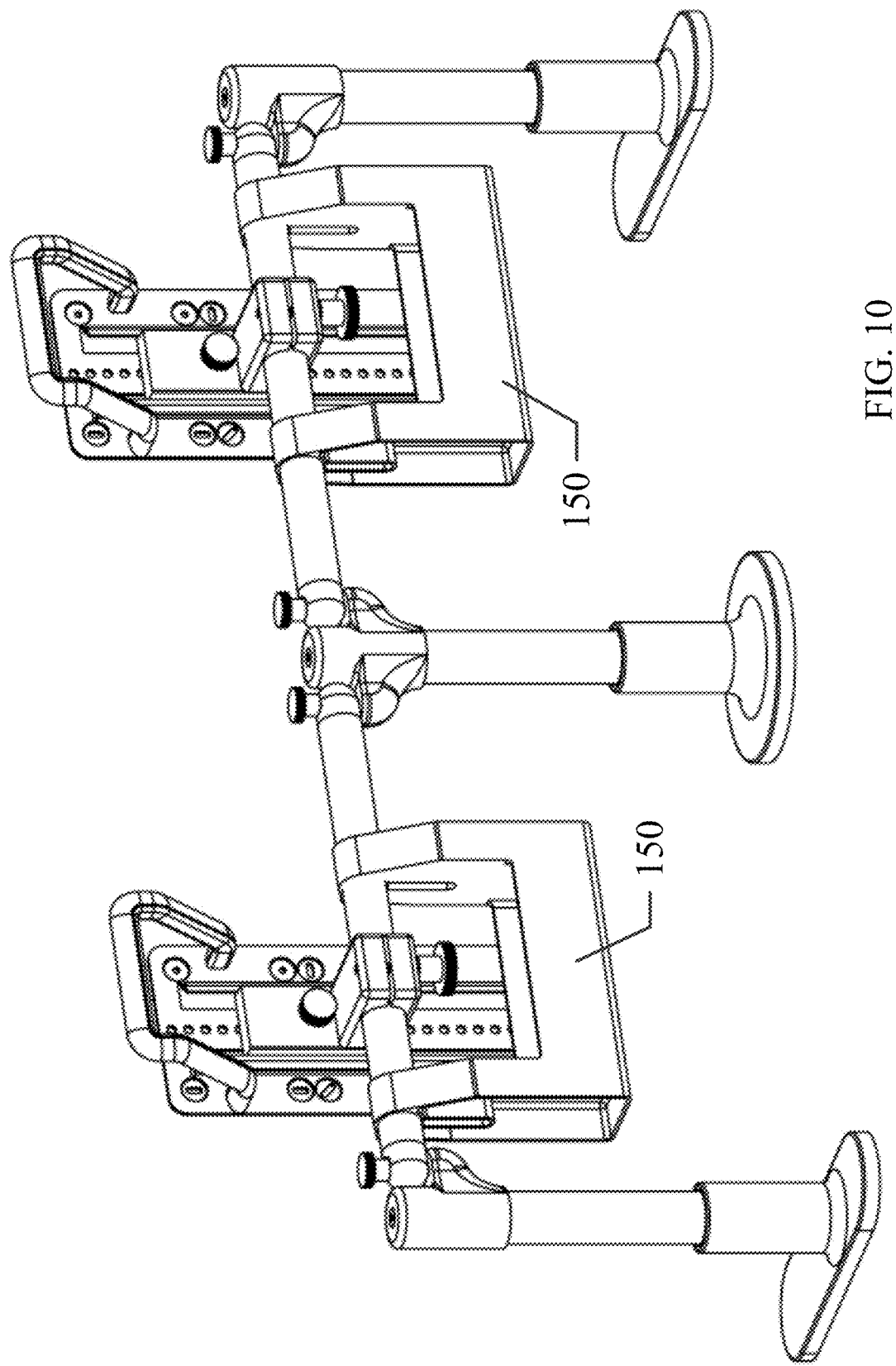
FIG. 10 depicts a rear perspective view of an embodiment of a display mounting system with cable management subsystems attached.
Figure 11:
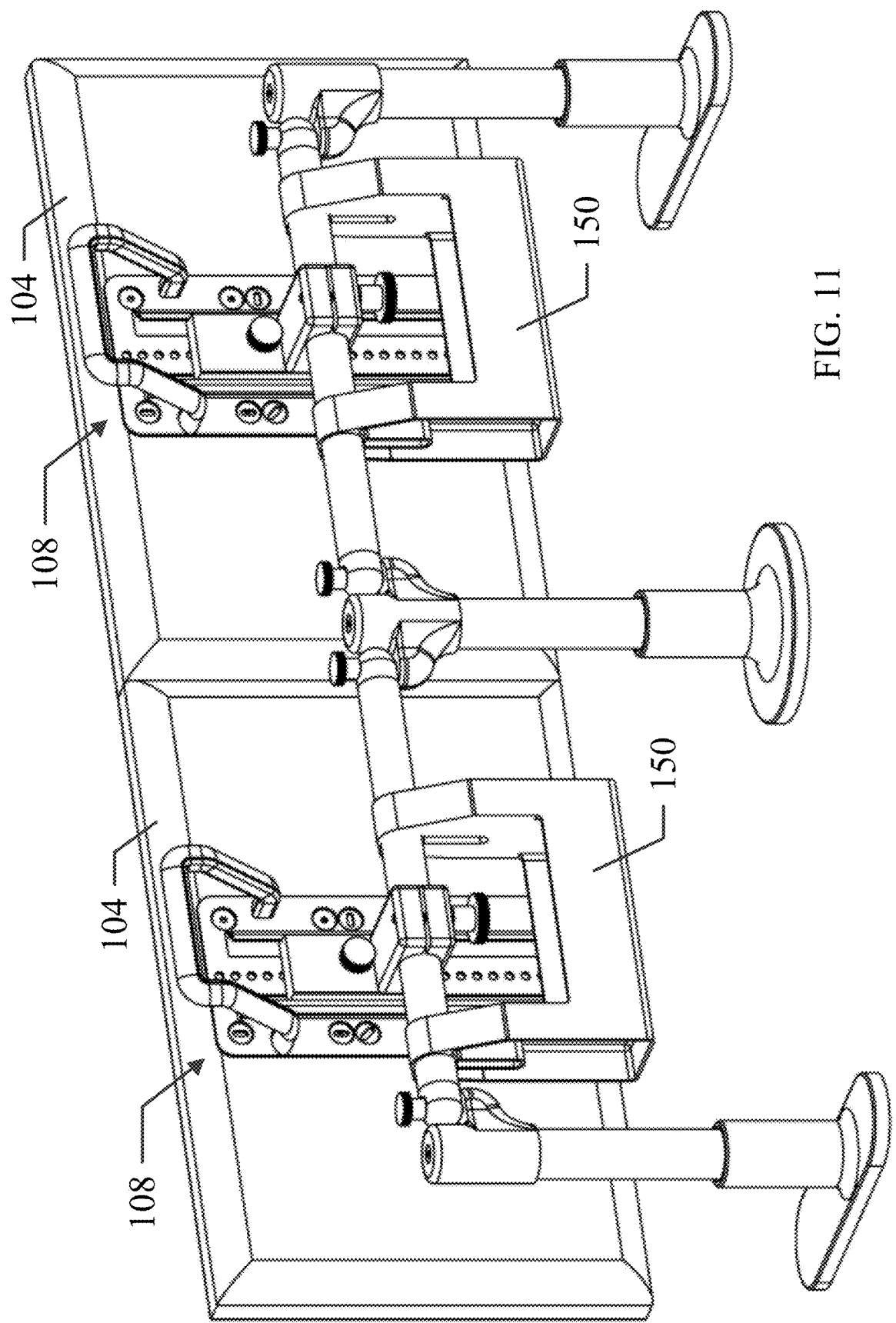
FIG. 11 depicts a rear perspective view of the display mounting system of FIG. 10 with displays attached.
Figure 15:
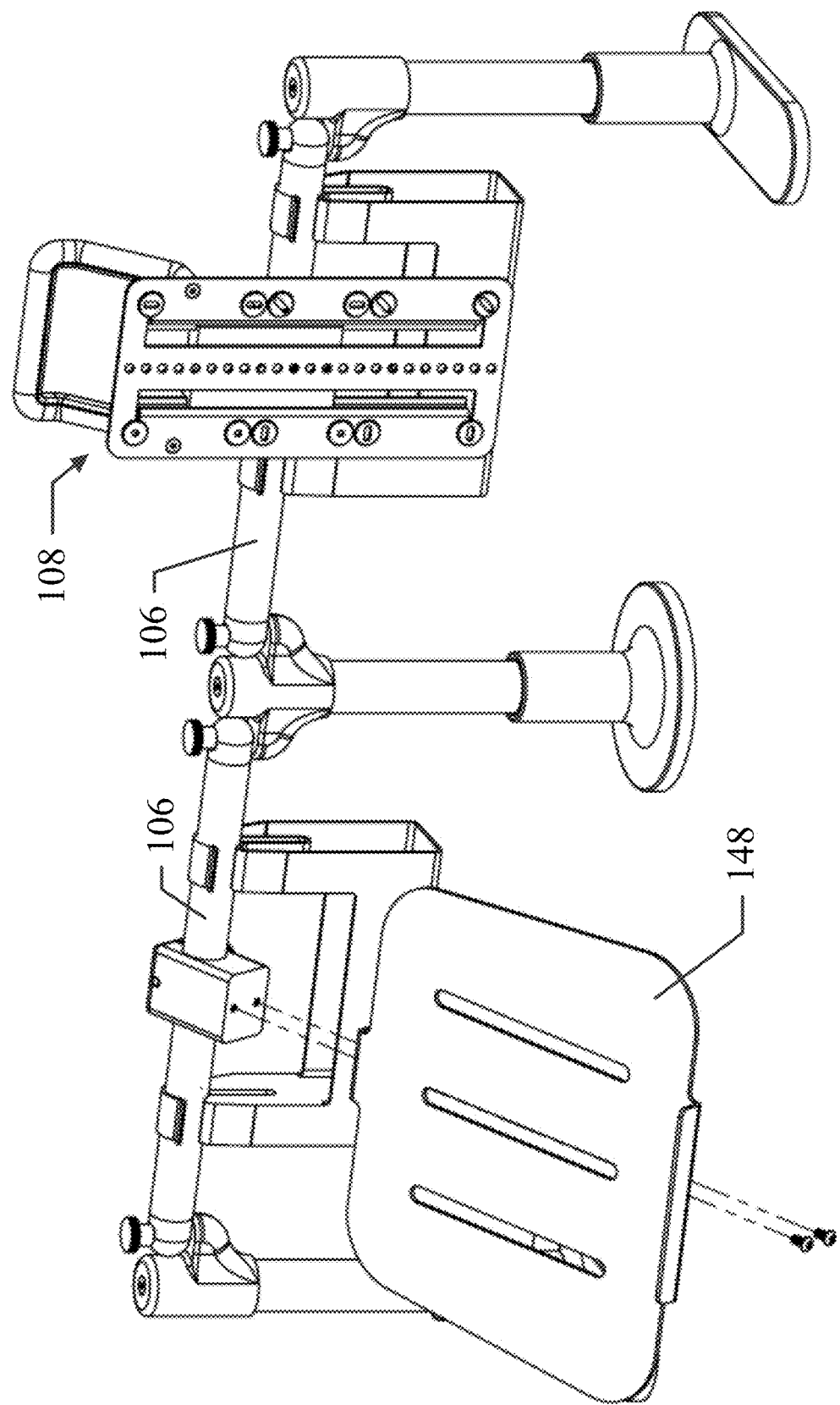
FIG. 15 depicts a front perspective view of another embodiment of a display mounting system with a laptop tray attached.

In embodiments, the display mounting system 100 can also mount a variety of devices not limited to computer monitors and displays 101. For example, as shown in FIG. 15, the mounting plate 110 of the mounting bracket 108 may be selectively detached from the clamping block 134 and a laptop tray 148 attached. Further, the support arms 106 can receive a variety of attachments in addition to a mounting bracket 108. For example, as shown in FIGS. 10 and 11, a cable management subsystem 150 can be attached to the one or both of the support arms 106. The cable management subsystem 150 can be attached to the support arms 106 using hooks, a clasp, a fastener or any similar mechanism. In addition, it is specifically contemplated that the display mounting system 100 may further include a means for providing operating power to the electronic displays 101.

In an embodiment, to use the display mounting system 100, a user first places the system 100, in the open position, at a first location. The user can optionally substitute a clamp-style base 124 for the standard platform-style base 122 by detaching the platform-style base 122 from the central upright support 102 and attaching a clamp-style base 124. Next, the user can optionally attach displays 101 to the mounting brackets 108 on the support arms 106 and use the attached displays 101. Prior to attaching a display 101 to a mounting bracket 108, the user can adjust the height and angle of the mounting plate 110 for use. In preparation to transport the system 100 to a second location, the user rotates the support arms 106 around the central upright support 102 to the collapsed position. The user can leave the displays 101 attached or, alternatively, remove any attached displays 101 prior to transporting the system 100. The user can also secure the display mounting system 100 in the collapsed position via a securing mechanism. Once the system 100, with or without attached displays 101, is in the collapsed position, the user lifts the system 100, via the combined handle 136. The user then carries the system 100 to a second location, sets the system 100 down, undoes any mechanism securing the support arms 106 in the collapsed position and unfolds the support arms 106 into the open position. At this point, the user can once again optionally substitute a clamp-style base 124 for the standard platform-style base 122 of the central upright support 102, or vice versa. The user then reattaches any displays 101 that had been removed and uses the displays 101.

At any step in this method, the user could optionally reduce the display mounting system 100 to mount a single display 101 or expand the system 100 to mount three or more displays 101. For transport, the user would return the system 100 to the two-display embodiment, transport the system 100, then reduce or expand the system 100 as desired.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A display mounting system, comprising:
    a central upright support;
    a first support arm connecting a first terminal upright support to the central upright support;
    a second support arm connecting a second terminal upright support to the central upright support;
    at least one mounting bracket comprising a U-shaped grab handle and a mounting plate configured to receive an electronic display, wherein the mounting bracket is connected to one of the support arms, wherein at least one support arm rotates relative to the central upright support to move the terminal upright supports between an open position and a collapsed position; and
    a second, U-shaped grab handle, wherein each of the grab handles is connected to a separate support arm and wherein the grab handles interface to form a single, combined handle configured to support the weight of the display mounting system and attached displays and designed to be grabbed by one hand when the display mounting system is in the collapsed position.

2. The display mounting system of claim 1, wherein the central upright support comprises:
    a double-arm connector that engages the two support arms;
    a base configured to partially support the weight of the display mounting system and attached displays; and
    a leg connecting the double-arm connector and the base.

3. The display mounting system of claim 2, wherein the base is removable.

4. The display mounting system of claim 2, wherein the base comprises a clamping mechanism.

5. The display mounting system of claim 1, wherein the terminal upright supports each comprise:
- an arm connector that engages one support arm;
- a foot configured to prevent the display mounting system from tipping under the additional weight of attached displays; and
- a leg connecting the arm connector and the foot.

6. The display mounting system of claim 5, wherein the feet of the terminal upright supports are rotatably connected to the bottom of the legs of the terminal upright supports, wherein the feet are configured to rotate with respect to the leg to reduce width of the display mounting system in the collapsed position.

7. The display mounting system of claim 1, wherein the mounting bracket comprises
- a fastening mechanism connected to the mounting plate and configured to attach to a support arm.

8. The display mounting system of claim 1, wherein the mounting bracket further comprises a height adjustment mechanism.

9. The display mounting system of claim 1, wherein in the open position the support arms extend in substantially opposite directions from a double-arm connector of the central upright support and in the collapsed position the support arms are substantially parallel to each other, extending in substantially the same direction from the double-arm connector of the central upright support.

10. The display mounting system of claim 9, further comprising a fastening mechanism configured to secure the support arms in the collapsed position.

11. The display mounting system of claim 1, wherein the central upright support and a support arm are configured to be removed such that the remaining support arm connects the first terminal upright support directly to the second terminal upright support and the display mounting system can receive a single display.

12. The display mounting system of claim 1, wherein the support arms are removably connected to the upright supports and the display mounting system is configured to receive additional central upright supports and support arms such that the display mounting system can receive three or more displays.

13. The display mounting system of claim 1, further comprising a laptop tray connected to one of the support arms and configured to hold a laptop computer.

14. The display mounting system of claim 1, further comprising a cable management system connected to one of the support arms.

15. A display mounting system having an open position for use and a closed position for transport comprising:
- a central upright support having a double-arm connector and a base;
- a first support arm rotatably connecting the central upright support to a first terminal upright support, the first terminal upright support having a first arm connector and a first foot;
- a second support arm connecting the central upright support to a second terminal upright support, the second terminal upright support having a second arm connector and a second foot;
- a first mounting bracket, having a first mounting plate, and a first U-shaped grab handle, the first mounting plate connected to the first support arm and configured to receive a first electronic display; and
- a second mounting bracket, having a second mounting plate, and a second U-shaped grab handle, the second mounting plate connected to the second support arm and configured to receive a second electronic display, wherein when in the closed position the first and second support arms are substantially parallel and extend in substantially the same direction from the central upright support and the U-shaped grab handles form a single, combined handle.

* * * * *